United States Patent [19]
Fairhurst

[11] Patent Number: 5,986,717
[45] Date of Patent: Nov. 16, 1999

[54] REAL-TIME VIDEO PRODUCTION USING RECURSIVE TECHNIQUES

[76] Inventor: Jon A. Fairhurst, 3702 NE. 288th, Camas, Wash. 98607

[21] Appl. No.: 08/883,991

[22] Filed: Jun. 27, 1997
     (Under 37 CFR 1.47)

[51] Int. Cl.[6] .............. H04N 5/272; H04N 9/74
[52] U.S. Cl. ................. 348/584; 348/579; 348/586
[58] Field of Search .................. 348/845.2, 584, 348/585, 586, 587, 579; 382/265; H04N 5/272, 9/74

[56] References Cited

U.S. PATENT DOCUMENTS

| | | | |
|---|---|---|---|
| 5,315,390 | 5/1994 | Windrem | 348/584 |
| 5,353,068 | 10/1994 | Moriwaki | 348/585 |
| 5,408,272 | 4/1995 | Barnett | 348/585 |
| 5,428,401 | 6/1995 | Hinson | 348/586 |
| 5,568,204 | 10/1996 | Takamori | 348/584 |
| 5,619,277 | 4/1997 | Kobayashi | 348/579 |

*Primary Examiner*—Howard Britton
*Attorney, Agent, or Firm*—Francis I. Gray

[57] ABSTRACT

A real-time video production technique using recursive techniques adds an output framestore, a feedback storage unit and a synchronized controller to a pipelined video processing system. Partial composites are stored in the feedback storage unit while complete composites are stored in the output framestore. The output framestore provides a preview video during the video processing. For automatic assembly where the feedback storage unit has a length of many frames the complete composites are stored also in the feedback storage unit and a multiplexer is used to select the complete composites either from the output framestore for each new complete composite or from the feedback storage unit otherwise.

6 Claims, 1 Drawing Sheet

REAL-TIME VIDEO PRODUCTION USING RECURSIVE TECHNIQUES

BACKGROUND OF THE INVENTION

The present invention relates to video processing, and more particularly to real-time video production using recursive techniques that substantially reduce the cost of pipelined video processing.

Video processing generally is done with one of two techniques: process the video in real-time using a pipeline approach; or digitize the video and process it with a computer. The computer approach is flexible and may be implemented in a low cost fashion, but it has limited input/output and processing speed and renders much of its work in non-real-time. Pipelined processing is guaranteed to perform certain tasks in real-time, but can be expensive and inflexible.

A standard pipelined video processing system has multiple video inputs and one or more outputs, and is able to process and combine a certain number of video inputs, or layers, simultaneously and at full temporal and spatial resolution. The problem arises when more layers need to be combined. In the standard pipelined system a subset of the total layers is processed and recorded to tape or disk. This composite is then combined and processed with other layers at a later time. This process of "multiple passes" is done until all of the video layers are composited.

Aside from the additional time required to process these multiple passes, this process is undesirable because it is prone to operator errors. If the color, position or timing of the first layers are dependent upon layers which are to be combined later, the operator needs to use approximations and estimate how the final product will appear. If the result is not correct, much, if not all, of the work done to that point may need to be reprocessed. The bottom line is that once the number of layers, or level of processing, has crossed a fixed threshold, the operator is no longer able to preview the final result as the creative decisions are being made.

What is desired is an improved real-time video production process that maintains the speed of pipelined video processing at a reduced cost.

SUMMARY OF THE INVENTION

Accordingly the present invention provides real-time video production using recursive techniques that substantially reduces the cost of pipelined video processing while maintaining the real-time nature of pipelining by combining a pipelined video processor with an output frame store, a feedback storage unit and a synchronized controller.

The objects, advantages and other novel features of the present invention are apparent from the following detailed description when read in conjunction with the appended claims and attached drawing.

DESCRIPTION OF THE PREFERRED EMBODIMENT

Figure 1:
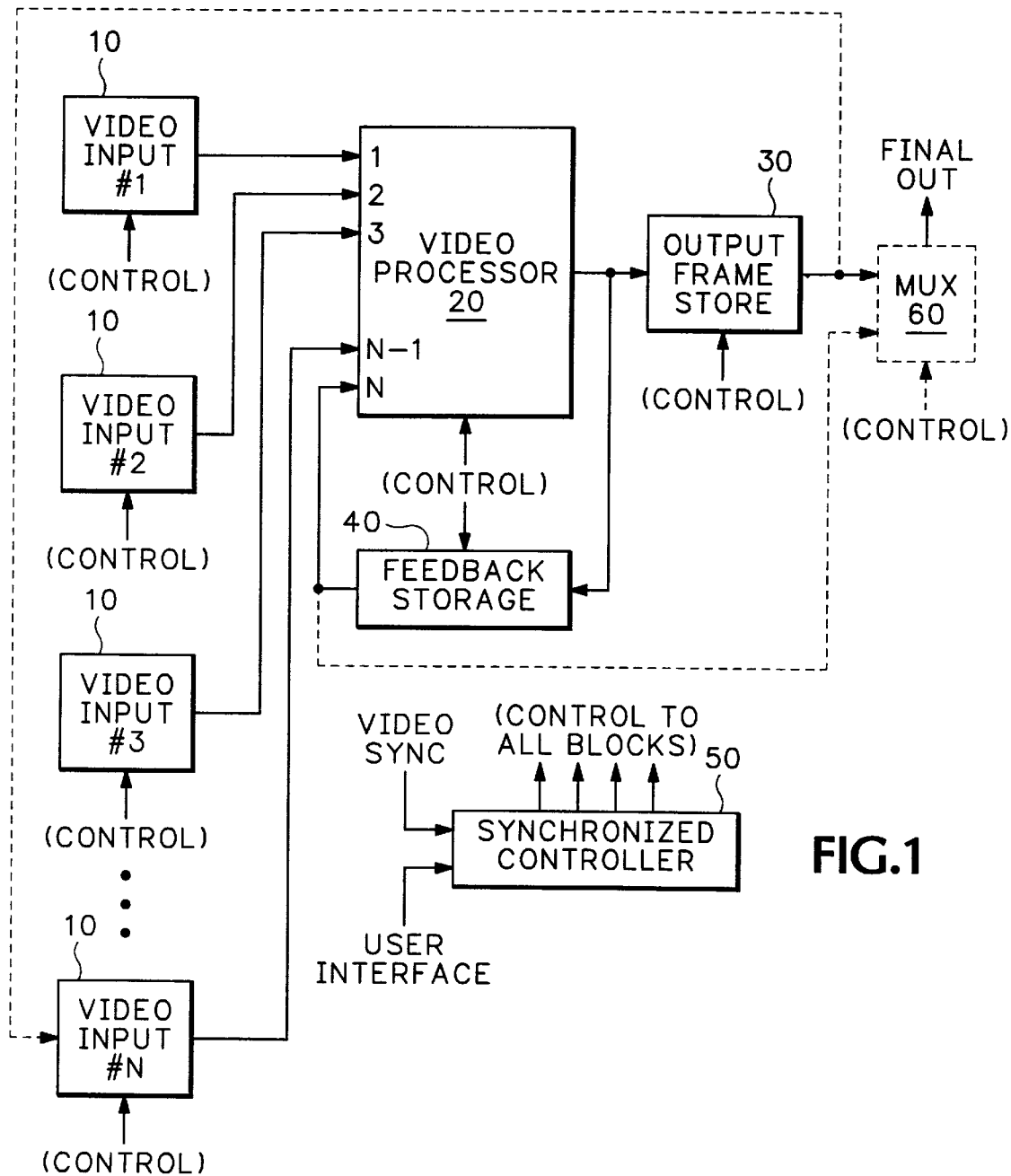
FIG. 1 is a block diagram view of a real-time video production system using recursive techniques according to the present invention.

Referring now to FIG. 1 a plurality of controllable video input devices 10, such as tape recorders, disc recorders, cameras, satellite feeds, cable feeds, character generators, graphics devices and the like, are input to a conventional pipelined video processor 20, such as the Grass Valley Model 1200, 2200, 3000 or 4000 switchers or the Grass Valley DPM-700 and DPM-4300 video effects devices, which has between two to n inputs and at least one output. The output from the video processor 20 is input to both an output frame store 30 and to a feedback storage unit 40. The feedback storage unit 40 provides another video input to the video processor 20, either in the form of a single frame of video like the output frame store 30 or in the form of a series of video frames like a tape or disk recorder. A synchronized controller 50 in response to a video sync signal, derived either from one of the input video signals or from a master sync source as is well known in the art, and a user interface signal provides control signals for all of the elements of the system. The control signals may include the standard tape machine functions of Play, Stop, Pause, Rewind and Fast-Forward for the video input devices 10, input selection and combination controls for the video processor 20, freeze or pass-through control for the output frame store 30, and write and readout control signals for the feedback storage unit 40. For single pass operation, and whenever a final composite frame of video is generated, the output frame store 30 is transparent and the feedback storage unit 40 is not used, otherwise the output frame store is frozen for partial composites, as explained below. In the single pass scenario the processor and controller 20, 50 behave in a conventional fashion as one would expect with currently available pipelined video processing equipment.

When multiple passes are required, the first frame of video is processed in a first pass by the video processor 20 and stored in the feedback storage unit 40. During the second frame of video the remaining layers are combined by the video processor 20 with the partial composite stored in the feedback storage unit 40 to create a single frame of fully processed video. This final composite is stored and displayed by the output frame store 30 as a preview video. During the third frame the next partial composite is processed by the video processor 20 and stored in the feedback storage unit 40 while the output frame store 30 continues to display the most recent completely composited video frame. The fourth frame creates another complete composite in the same fashion as the second frame, and provides another frame for the preview video via the output frame store 30. The result is that the preview video has one-half of the normal video frame rate, but the processor 20 is able to immediately composite twice as many layers as would normally be able to be processed. This could be viewed at half-speed with full temporal resolution or at full speed with half of the normal temporal resolution.

More specifically for a two-pass process consider that the operator has a ten second video clip to be generated from a background video from video input device #1 with a chroma key over this background from video input device #2. A second chroma key is requested from video input device #3 to be over both the background and first chroma key. The three input devices 10 are to start rolling at SMPTE time code 1:00:00:10 (hour one, frame ten). The video processor 20 for this example has only a single chroma keyer, which is why two passes are required.

First the synchronized controller 50 cues up video input devices #1 and #2 to 1:00:00:10. Video input device #3 will be added on the second pass, so it is cued up by the controller 50 to 1:00:00:09. For the first frame of video, video input device #1 is applied as the background and video input device #2 is applied as the input to the chroma keyer, with any user controls for this layer applied via the controller 50 to the chroma keyer during this frame of processing. The output frame store 30 has not yet received any completed composites, so it is in the freeze mode or alternatively displays a black output. The feedback storage unit 40 records this partially composited frame of data from the processor 20.

During the second processing frame video input device #3 is now at time code 1:00:00:10 and is applied to the input of the chroma keyer. The output from the feedback storage unit 40 contains the composite of layers #1 and #2 from 1:00:00:10, and this is applied to the background layer input according to control signals from the controller 50. The chroma key controls now represent the user input for the second chroma key layer via the controller 50, as the creative input is liable to be unique for each independent layer. The output frame store 30 now is placed in the pass through mode, recording the first fully composited frame of video while simultaneously displaying it. The feedback storage unit 40 is in playback mode only and does not need to record anything during this frame.

The third frame of processing is nearly identical to the first. The only difference is that the output frame store 30 is in the freeze mode, displaying the output from frame two, and video input devices 10 are at 1:00:00:12, 1:00:00:12 and 1:00:00:11 respectively. Frame four is identical to frame two, except for the advance in time codes. This process continues for the next ten seconds until the preview of the clip is complete. Throughout this process the operator may make adjustments to the various processing parameters via the controller 50 for each independent layer.

At this point the preview function is completed. The operator now needs to render the final version, which is done with the push of a button with the controller 50 performing all the duties. If the feedback storage unit 40 is a single frame buffer in length, then the output from the output frame store 30 is fed back to a recording input of one of the video input devices 10. This video input device is the "record machine." If the feedback storage unit 40 is a disk or tape recorder, it may be used as the record machine. For final rendering a standard two pass process is then used, where the entire ten second composite of the background and the first chroma key layer are recorded by the record machine. A second ten second pass adds the final chroma key layer to the partial composite and the clip is complete.

The same principals apply if more and more layers are required. In each case partial composites are generated field by field and are recorded by the feedback storage unit 40. This unit needs to be capable of playing back the last frame of video while recording the current partial composite simultaneously. The output frame store 30 passes through only complete composites and displays a frozen complete composite while any partial composites are being built. The synchronized controller 50 is tasked with making this all transparent to the operator. As more passes are required, more frames are dropped. For N passes only one of every N frames is previewed.

The above example demonstrates a mode of preview that drops every other frame of video for a two pass process. This is fine for adjusting effects, but is poor for determining precise edit points. To preview every frame at half speed, when two passes would otherwise be required, all processing is identical but the time code control to the input devices is altered. Here all the video input devices 10 are synchronized, but are incremented to the next time code on every other frame. For N passes the video input devices 10 are incremented once for every N fields of processing.

If the feedback storage unit 40 can store a long sequence of frames, automatic assembly is possible. For a two pass sequence the feedback storage unit 40 records all of the information from a given preview. If the operator makes no control changes and previews the video a second time, the alternate frames are composited as compared to the first preview sequence, providing a preview of the full temporal bandwidth. To make this possible a multiplexer 60 is added, having the outputs of the feedback storage unit 40 and the output frame store 30 as inputs. The multiplexer 60 switches to the output frame store 30 whenever it receives a new full composite, and to the feedback storage unit 40 when a partial composite is being generated since the full composite for that frame has already been stored in the feedback storage unit and this is displayed.

For an N pass clip the operator needs to request a preview without changes N times to automatically provide a full bandwidth preview. No rendering is required once a full bandwidth preview is ready to be generated.

Returning to the two pass process the operator needs to compromise either speed or temporal resolution on the first preview. For four passes, however, the operator may choose to preview every fourth frame at full speed, every frame at one quarter speed, or every other frame at half speed. The only difference to the synchronized controller 50 is in the incrementing of the time code to the video input devices 10. For N pass clips the speed is m/N of real time, where m ranges from one to N. The temporal resolution is then 1/m of full resolution.

Thus the present invention provides for real-time video production using recursive techniques by adding an output frame store at the output of a pipelined video processor and a feedback storage unit between the output of the video processor and an input to the video processor, all under control of a synchronized controller.

What is claimed is:

1. A video processing system of the type having a plurality of video input devices coupled to a video processor having a plurality of inputs for selectively compositing video signals from the video input devices into at least one video output further comprising:

an output framestore having an input coupled to the at least one video output and having an output;

a feedback storage unit having an input coupled to the at least one video output and having an output coupled to one of the plurality of inputs of the video processor; and means for synchronously controlling the video processing system so that the output framestore stores a fully composited video signal from the at least one output of the video processor and the feedback storage unit stores a partially composited video signal from the at least one output of the video processor for input to the video processor so that the output of the output framestore provides a realtime preview of the video compositing.

2. The video processing system as recited in claim 1 further comprising a multiplexer having as inputs the outputs from the output framestore and the feedback storage unit where the feedback storage unit has the capability of storing a long sequence of frames to provide automatic assembly of a final edit, the feedback storage unit storing both the partially and fully composited video signals from the at least one output of the video processor.

3. A method of compositing a plurality of video signals comprising the steps of:

compositing at least two of the video signals to produce a partial composite video signal;

storing the partial composite video signal in a feedback storage unit;

compositing the partial composite video signal from the feedback storage unit with at least one other of the video signals to produce a complete composite signal; and storing the complete composite signal in an output framestore, the complete composite signal being available for preview.

4. A method of compositing three input video signals comprising the steps of:

setting up a time code on two of the video signals to be composited in a first pass to a first value and a time code on the third video signal to be composited in a second pass to a second value one frame less than the first value;

compositing the two video signals in the first pass to produce a partial composite video signal;

storing the partial composite video signal in a feedback storage unit;

compositing the partial composite video signal from the feedback storage unit with the third video signal to produce a complete composite video signal;

storing the complete composite video signal in an output framestore from whence it is available as a preview video signal; and incrementing the time codes in the setting up step and repeating the compositing and storing steps until a desired composited video clip is completed.

5. A method of compositing a plurality of video signals in N passes comprising the steps of:

setting up a time code for each of the video signals as a function of the pass in which it is composited;

initially compositing at least two of the video signals having the same time code to produce a partial composite video signal;

storing the partial composite video signal in a feedback storage unit;

incrementing the time codes for the video signals;

compositing the partial composite video signal from the feedback storage unit as one of the video signals with at least one of the video signals having the same time code;

repeating the storing, incrementing and compositing steps until N passes have been completed to produce a complete composite video signal;

storing complete composite video signal in an output framestore so as to be available as a preview video signal; and repeating the above steps for a next frame of the video signals to produce a composite video sequence of a desired length.

6. A method of compositing a plurality of video signals in N passes comprising the steps of:

setting up a time code for each of the video signals as a function of the pass in which it is composited;

initially compositing at least two of the video signals having the same time code to produce a partial composite video signal;

storing the partial composite video signal in a feedback storage unit;

incrementing the time codes for the video signals;

compositing the partial composite video signal from the feedback storage unit as one of the video signals with at least one of the video signals having the same time code;

repeating the storing, incrementing and compositing steps until N passes have been completed to produce a complete composite video signal;

storing the complete composite video signal in an output framestore and in the feedback storage unit;

repeating the above steps for a next frame of the video signals to produce a composite video sequence of a desired length; and selecting the output from the output framestore as an output video signal for each new complete composite video signal, otherwise selecting the composite video signal stored in the feedback storage unit.

* * * * *